Figure 1:
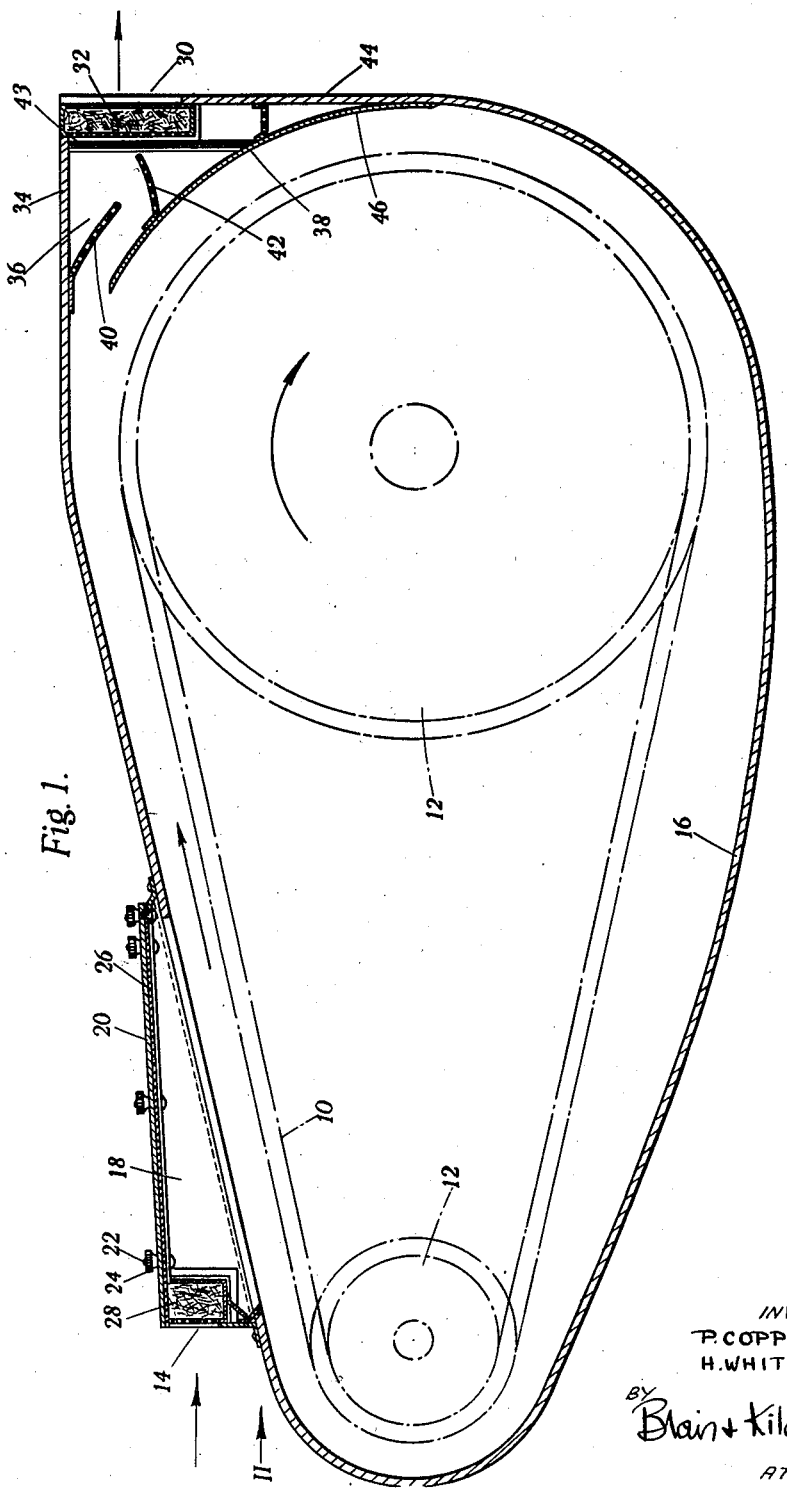

March 30, 1943. P. COPP ET AL 2,315,317
CASING FOR CHAIN BELT AND LIKE TRANSMISSIONS
Filed Aug. 1, 1940 3 Sheets-Sheet 1

INVENTORS
P. COPP
H. WHITELEY
BY Blair + Kilcoyne
ATTORNEYS

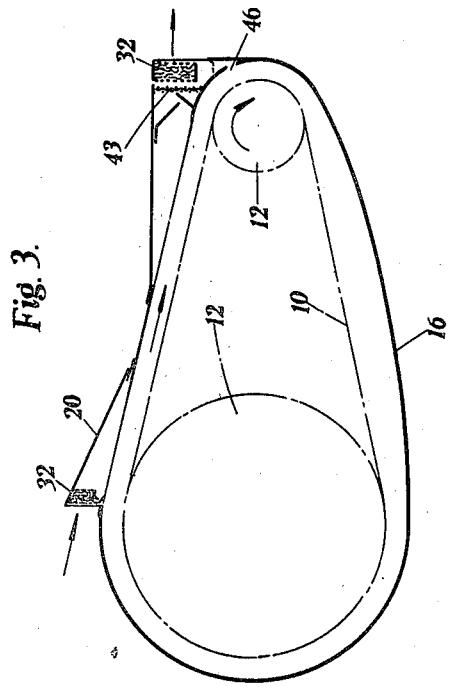
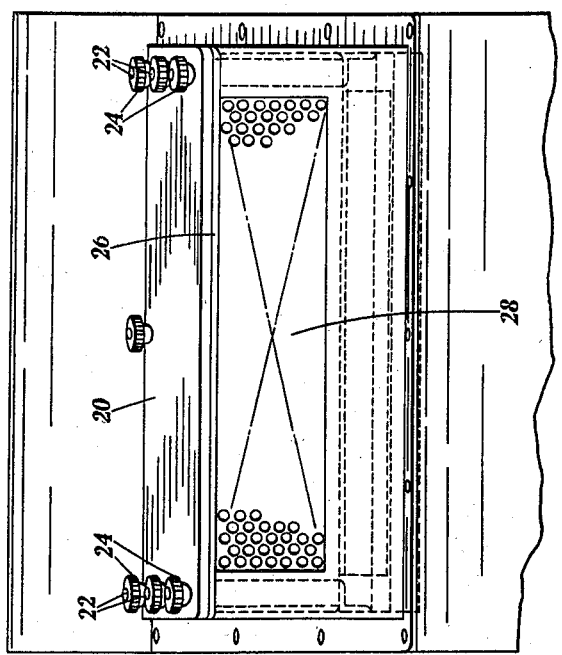

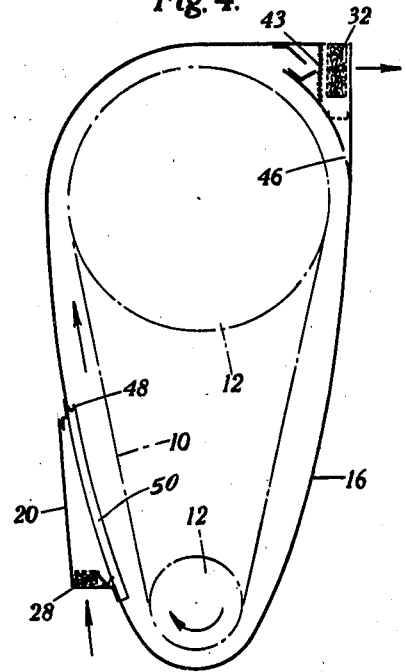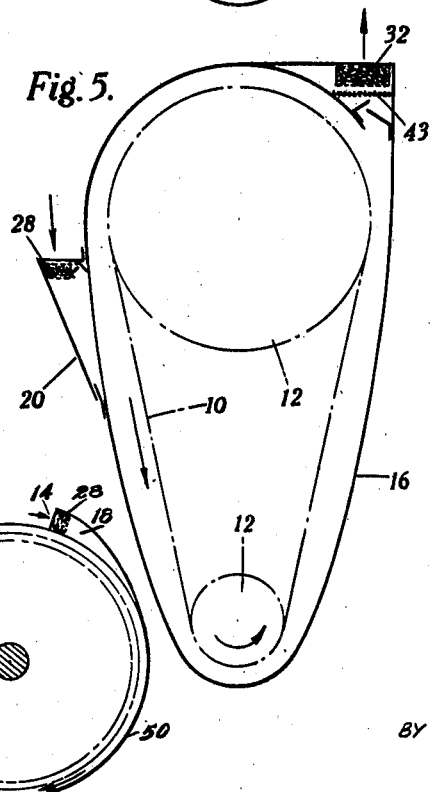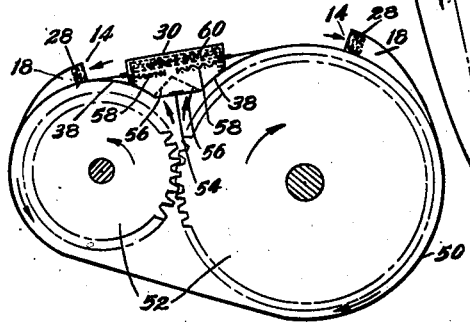

Patented Mar. 30, 1943

2,315,317

UNITED STATES PATENT OFFICE 2,315,317

CASING FOR CHAIN BELT AND LIKE TRANSMISSIONS

Philip Copp, Didsbury, Manchester, and Harold Whiteley, Cleckheaton, England, assignors to The Renold and Coventry Chain Company Limited, Didsbury, Manchester, England Application August 1, 1940, Serial No. 349,134
In Great Britain August 17, 1939

3 Claims. (Cl. 74—219)

When a chain, belt or similar drive transmission is enclosed in a casing an appreciable amount of heat is generated by the churning of the air inside the casing and undesirable increases of temperature often occur.

This invention aims at overcoming this disadvantage by providing means whereby the motion of the chain or the like introduces a current of air through the casing.

According to this invention the casing is formed with two apertures spaced apart and situated in such a way that the motion of the gearing within the casing induces a current of air from one aperture to the other, the aperture by which the air leaves the casing being preferably provided with baffle means for preventing the escape of lubricant entrained by the air.

When the invention is applied to a chain transmission the inlet aperture is situated close to the chain at a part of the casing a short distance along one of the free lengths of the chain from the point at which it leaves one of the wheels of the transmission. By placing the inlet aperture in that situation the escape of oil flung from the wheel by centrifugal force cannot occur, as it would if the aperture were situated immediately opposite that point, while it is found that a vigorous current of air inwards from the aperture is induced by the circulation of air within the casing caused by the motion of the chain. Conveniently, the exhaust aperture is at the end of the casing remote from the inlet aperture, but on the same side of the line joining the centres of the two wheels as that aperture.

Referring to the accompanying drawings,

Figure 1 is a side elevation in section of a preferred form of the invention as applied to a chain drive in which the line joining the centres of the two sprocket wheels is horizontal, Figure 2 is an end elevation of a part of the casing on a larger scale looking in the direction of the arrow II in Figure 1, Figure 3 is a similar view of another form, Figures 4 and 5 illustrate two forms of the invention applied to chain drives, in which the line joining the centres of the sprocket wheels is vertical, and Figure 6 illustrates the invention applied to spur gear drive.

Referring to Figure 1, the upper run of the chain 10 is shown travelling towards the larger of the two sprocket wheels 12 and the air within the casing circulates in the same direction. The inlet aperture 14 is at the top of the casing 16 a short distance from the vertical line through the axis of the smaller sprocket wheel from which the upper run of the chain is received. This inlet aperture is constituted by the open end of a louvre-like extension 18 of the casing, the top of which, 20, is detachable thereby serving as an inspection cover. This cover is secured by screws 22 and knurled nuts 24, and an airtight packing 26 is interposed between the cover 20 and the marginal surfaces against which it fits. The opening is provided with a removable filter pad 28 of glass wool or other suitable filtering medium to prevent the entry of dust. Glass wool has been found to be very efficient for this purpose as it offers a minimum of obstruction to the flow of air.

The exhaust aperture 30 is at the other end of the casing at the top and is considerably larger in area than the inlet aperture. It may also be provided with a removable filter pad 32. An extension of the casing forms an exhaust chamber 36 which is angular in shape and the circular end part of the casing following the periphery of the wheel is retained within the extension to constitute a baffle 38, there being a gap between the upper part of the extension 34 and the baffle 38 so that air carried along between the chain and the top of the casing can pass straight into the extension 36 and out from the exhaust aperture 30 at the end.

The addition of baffles 40, 42 in the form of sheets of perforated metal are provided within the exhaust 36. The baffle 40 is attached to the inside of the top of the extension 34 and extends downwards and towards the exhaust aperture 30, while the baffle 42 is attached to the outer side of the arcuate baffle 38 and is inclined upwardly as shown. These baffles catch droplets of oil that may be entrained by the air and this oil finds its way down to the bottom of the exhaust chamber in the angle between its end wall 44 and the baffle 38, a hole 46 being formed in the baffle 38 at this point to permit the oil to return to the interior of the casing. The provision of this exhaust chamber 36 causes the velocity of the air to be reduced as it enters it and this favours the precipitation of the oil droplets. A screen of fine wire gauze 43 is provided to prevent any remaining droplets from reaching the filter pad 32.

The arrangement shown in Figure 3 differs from that shown in Figure 1 only in that the upper run of the chain recedes from the larger sprocket wheel 12 and moves towards the smaller sprocket wheel. The extensions 18 and 34 of the casing which provide the inlet and exhaust apertures therefore differ in shape from those shown in Figure 1, but the details of construction are substantially the same and therefore no further description is required.

Figure 4 represents an arrangement suitable for a chain drive in which the line joining the centres of the sprocket wheels is vertical. In this case the inlet and exhaust openings are on opposite sides of the said line instead of being on the same side as in Figures 1 and 3. In other respects the detail construction is similar. The construction shown in Figure 5 differs from that shown in Figure 4 in that the exhaust opening is on the opposite side of the casing, at the upper end of the upwardly moving run of the chain, and is presented upwardly instead of horizontally. In addition, the inlet opening is on the side next to the downwardly moving run of the chain instead of next to the upwardly moving run as in Figure 4, and is presented upwardly instead of downwardly so that the air enters from above.

Referring again to Figure 4, it will be seen that oil running down the inside of the casing might find its way into the filter pad 28. This is prevented by a U-shaped guard 50 of channel section extending across and down the sides of the extension 48.

Figure 6 illustrates the application of the invention to a casing 50 for a gear drive consisting of two spur gear-wheels 52 rotating in the direction of the arrows. There are two inlet apertures 14 provided with filter pads 28, these apertures being at the open ends of louvre-like extensions 18 as in the constructions described earlier. The air within the casing tends to circulate in the direction of the arrows, with the result that air is drawn through the openings 14. Air is discharged through a single exhaust aperture indicated generally at 30, immediately above the point where the wheels 52 mesh, this aperture being guarded by baffles 38, 54 perforated baffles 56, 58 and an air filter 60.

When the wheels 52 rotate in the opposite direction the apertures 14, 30 are formed in the lower side of the casing and it will be appreciated that the action is exactly the same as in Figure 6.

We claim:

1. A casing for a chain drive transmission including a chain and two transmission wheels or gears formed with an inlet aperture situated close to the chain at a part of the casing in the immediate neighborhood of the point at which the chain leaves one of the wheels of the transmission and having an exhaust aperture spaced away from the inlet aperture in the direction of motion of the chain, in combination with baffles within the casing associated with said exhaust aperture for preventing the escape of lubricant entrained by the air circulating freely through the casing as a consequence of the movement of the chain.

2. A casing for a chain drive transmission including a chain and two transmission wheels or gears formed with an inlet aperture situated close to the chain at a part of the casing in the immediate neighborhood of the point at which the chain leaves one of the wheels of the transmission and having an exhaust aperture spaced away from the inlet aperture in the direction of motion of the chain, in combination with baffles within the casing associated with said exhaust aperture for preventing the escape of lubricant entrained by the air circulating freely through the casing as a consequence of the movement of the chain, said casing having an enlargement or extension of the periphery of the casing adjacent to a part of the other wheel which is engaged by the chain and in which the exhaust aperture is located, and baffles within the casing, one being constituted by a plate substantially parallel to the periphery of the adjacent wheel and having an aperture therein for the entry of circulating air into said enlargement.

3. A casing for a chain drive transmission including a chain and two transmission wheels or gears formed with an inlet aperture situated close to the chain at a part of the casing in the immediate neighborhood of the point at which the chain leaves one of the wheels of the transmission and having an exhaust aperture spaced away from the inlet aperture in the direction of motion of the chain, in combination with baffles within the casing associated with said exhaust aperture for preventing the escape of lubricant entrained by the air circulating freely through the casing as a consequence of the movement of the chain, said casing having an enlargement or extension of the periphery of the casing adjacent to a part of the other wheel which is engaged by the chain and in which the exhaust aperture is located, baffles within the casing, one being constituted by a plate substantially parallel to the adjacent part of the periphery of the wheel and having an aperture therein for the entry of circulating air into said enlargement, said aperture for the entry of circulating air being located near the point at which the chain engages the said wheel.

PHILIP COPP.
HAROLD WHITELEY.